Figure 1:
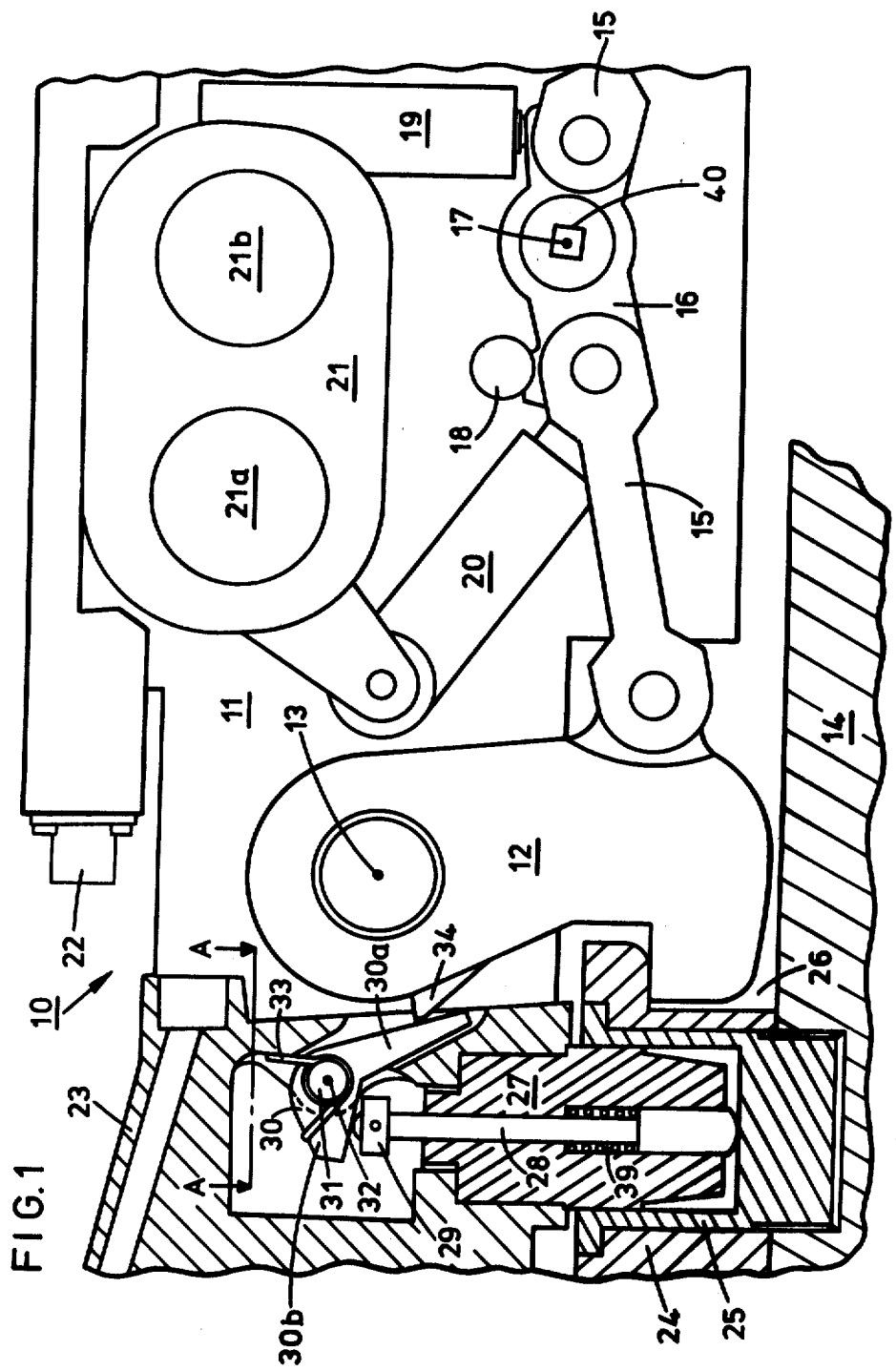

United States Patent [19]

Schorr

[11] 4,148,451
[45] Apr. 10, 1979

[54] HOOK LOCKING MEANS FOR EJECTOR RELEASE UNITS

[75] Inventor: Murray A. Schorr, Milton Keynes, England

[73] Assignee: Westland Aircraft Limited, Yeovil, England

[21] Appl. No.: 824,695

[22] Filed: Aug. 15, 1977

[30] Foreign Application Priority Data

Aug. 18, 1976 [GB] United Kingdom ............... 34502/76

[51] Int. Cl.² .............................................. B64D 1/02
[52] U.S. Cl. ................................ 244/137 R; 89/1.5 G
[58] Field of Search ............... 244/137 R; 294/83 R, 294/83 AE; 89/1.5 R, 1.5 C, 1.5 F, 1.56

[56] References Cited

U.S. PATENT DOCUMENTS

| 3,268,188 | 8/1966 | Roe et al. | 244/137 R X |
| 3,722,944 | 3/1973 | Dand | 244/137 R X |
| 3,936,019 | 2/1976 | Craigie | 244/137 R |

Primary Examiner—Barry L. Kelmachter
Attorney, Agent, or Firm—Larson, Taylor and Hinds

[57] ABSTRACT

The invention discloses an ejector release unit having a bell crank lever to positively lock the store retaining hooks in their retracted positions following release of a store. One arm of the lever is operatively associated with a surface on an adjustment hook when the hook is in its retracted position and the other arm of the lever is contacted by one end of a plunger. The other end of the plunger contacts a surface of the store so that, as the store is lifted into position, the lever is automatically moved out of engagement with the hook to permit the hook to be moved to its engaged position.

6 Claims, 4 Drawing Figures

HOOK LOCKING MEANS FOR EJECTOR RELEASE UNITS

This invention relates to store ejector release units (ERU's), that is to say, the units that are used for carrying jettisonable stores in an aircraft.

Conveniently, ERU's comprise a pair of longitudinally arranged hooks pivotally mounted on a support structure for movement between a retracted position so as to permit loading and release of a store and an engaged position in which the hooks engage supporting means provided on a store. The hooks are interconnected by a connecting linkage that is arranged about an intermediate pivoted lever, and an over-centre spring mechanism is associated with the linkage so as to urge the hooks into their retracted and engaged positions respectively.

A piston, arranged to be operated by gas pressure from the firing of one or more explosive cartridges, is usually associated with the linkage in order to move the hooks to their retracted position to effect release of the store, and pressurized gas is also supplied to a pair of ejector rams that positively force the released store away from the aircraft and thereby ensure its clean and positive separation from the aircraft.

In such an arrangement, the spring-loaded over-centre mechanism may allow the hooks to rebound to an intermediate position due to the considerable inertia of the hooks as the store is released. This can become a problem if the "false" position of the hook causes an alteration to any electrical switching systems, for example a store gone indicator system, that may result in incorrect information being supplied to an operator, and also means that the position of the hooks has to be checked after operation before a new store is fitted.

Furthermore, in existing ERU's, the pivoted lever is usually provided with a slot for engagement by a special spanner in order to effect manual movement of the hooks into their engaged positions to support a store after it has been lifted into position. This can be a time consuming and complicated manoeuvre especially when large, heavy and/or awkwardly shaped stores are being used that may at least partially obstruct access to the manual operating means.

Whilst automatic latching arrangements have been proposed, these usually rely on a projection from the store contacting a surface of the hook to move the hook into its engaged position against the force of the over-centre spring mechanism as the store is offered up.

Existing ERU's usually incorporate a sway-bracing means for bracing a store against swaying movements under lateral loads. Generally, such sway-bracing means fall into one of two types that have become known in the art as crutched and crutchless sway-bracing systems respectively. Briefly, a crutched sway-bracing system includes reaction pads symmetrically disposed two on each side of a longitudinal centreline of the store when the latter is supported by the hooks of the unit engaging so-called bale lugs on the store. The crutchless system involves the use of so-called saddle lugs on the store; these lugs have a substantial lateral width and are adapted to be engaged by complementary hook systems and by laterally spaced-apart wedges that act between the ERU body and the saddle lugs so as to brace the saddle lugs against the co-operating hooks to prevent swaying motion of the store.

In our co-pending U.S. Pat. application Ser. No. 789,841, an ERU is disclosed that is readily convertible to incorporate either a crutched or a crutchless sway-bracing system as desired, depending on the type of lug attached to a store to be carried.

The ERU of the present invention may be provided with either a crutched or a crutchless sway-bracing system and, in one of the embodiments hereinafter fully described, is shown incorporated in a convertible ERU as disclosed in our co-pending patent application.

Accordingly, the present invention provides an ejector release unit having a pair of longitudinally spaced-apart hooks pivotally mounted for movement between a retracted position to permit loading and release of a store and an engaged position in which the hooks are arranged to engage supporting lugs provided on a store, linkage interconnecting the hooks and operating means associated with the linkage to move the hooks between their engaged and retracted positions, a spring-loaded lever associated with at least one of the hooks and arranged so that an arm of the lever automatically engages a surface on the hook when in its retracted position so as to retain the hook in that position, and means, automatically operable during fitment of a store, to move the arm out of engagement with the hook, thereby permitting movement of the hook into engagement with the supporting lug on the store.

Preferably, the automatically operable means comprizes an axially slidable plunger having one end protruding from the unit for engagement by a surface of the store when the store is lifted into position.

The lever may comprise a bell crank lever having a second arm operatively associated with an opposite end of the plunger so as to effect release of the hook when a store is fitted.

The plunger may be located in a retaining member attached to the unit.

In one form of the invention in which the ejector release unit is provided with a crutchless sway-bracing system, the retaining member comprizes, conveniently, a spigot arranged for engagement, during operation, in a recess in a saddle lug attached to the store so that the protruding end of the plunger is engaged by a bottom surface of the recess when the store is lifted into position.

Alternatively, in another embodiment in which the ejector release unit is provided with a crutched sway-bracing system, the retaining member may comprize a nut screwed into the unit so that the protruding end of the plunger is engaged by an upper surface of a bale lug attached to the store when the store is lifted into position. Conveniently, in such an arrangement, the nut may also retain a crutch arm adaptor having laterally extending arms carrying reaction pads for engagement during operation with a surface of the store, thereby providing the crutched sway-bracing system.

In a further embodiment, a spring mechanism may be incorporated to permanently urge the hooks into their engaged position, thereby providing automatic latching of a store as it is lifted into position. Conveniently, in such an arrangement, the spring mechanism may be associated with the interconnecting linkage.

Figure 2:
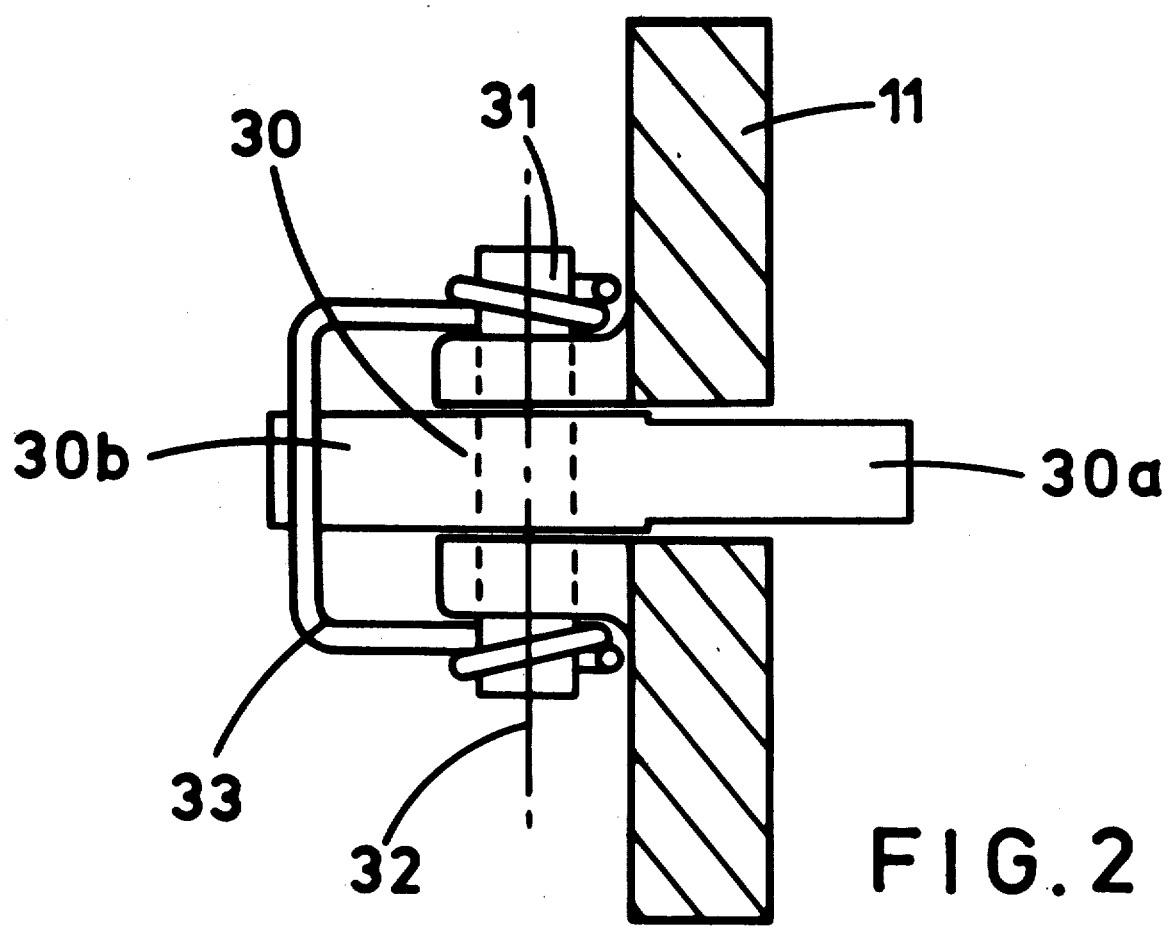
Figure 3:
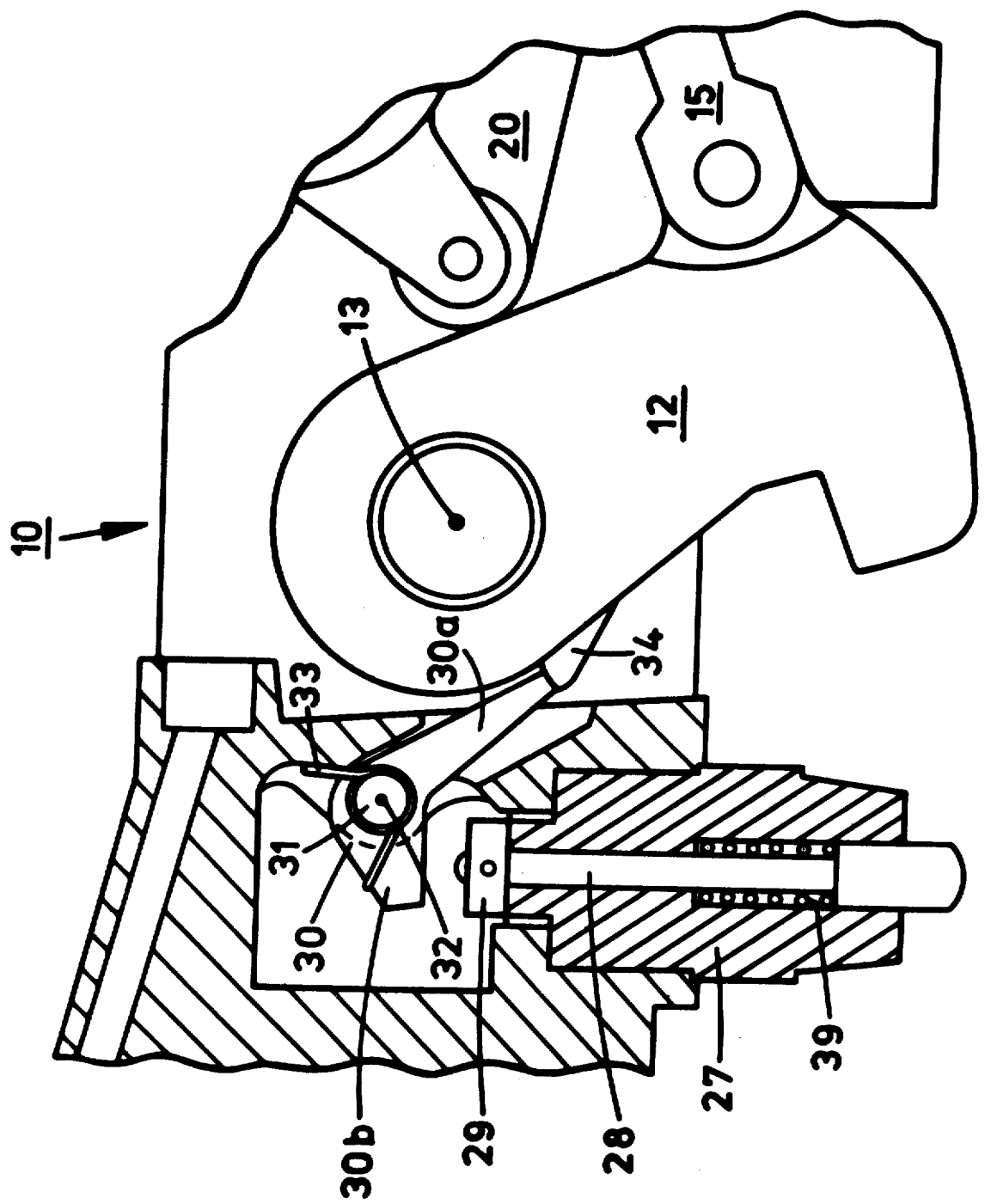
Figure 4:
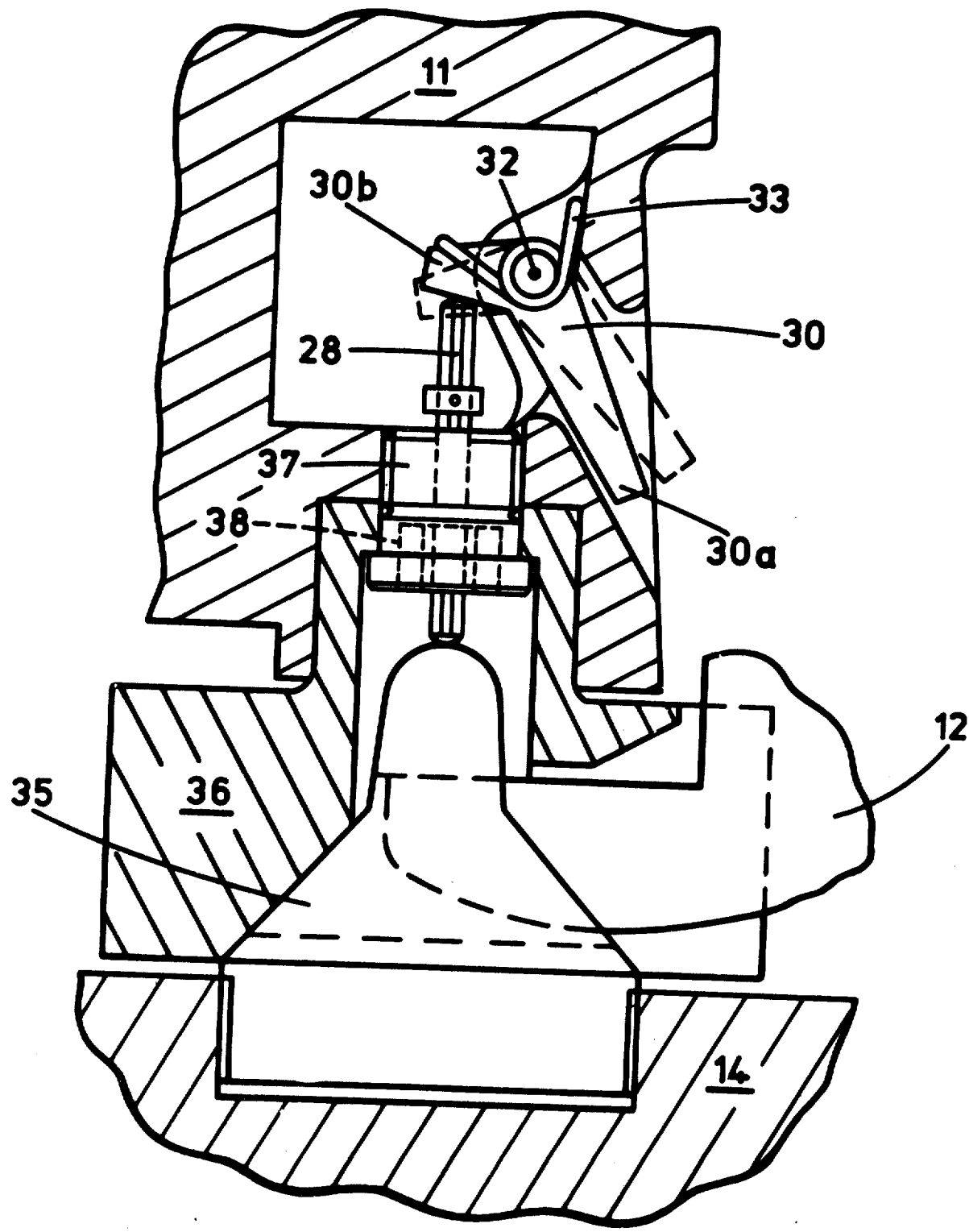

The invention will now be described by way of example only and with reference to the accompanying drawings, in which:

FIG. 1 is a fragmentary part-sectioned side elevation of one end of an ejector release unit constructed in accordance with one embodiment of the invention and illustrating one phase of operation, FIG. 2 is a part-sectioned view taken along lines A—A of FIG. 1, FIG. 3 is a view similar to FIG. 1 and illustrating a further phase of operation, and FIG. 4 is a fragmentary part-sectioned side elevation of one end of an ejector release unit constructed in accordance with a further embodiment.

Referring first to FIGS. 1, 2 and 3, an ejector release unit (ERU), generally indicated at 10, includes a body 11 supporting two longitudinally arranged hooks 12 (one only being shown) for pivotal movement about an axis 13 between an engaged position (FIG. 1) in which a store 14 is supported, and a retracted position (FIG. 3) in which the store 14 is released.

Connecting rods 15 are attached between each hook 12 and a lever 16 pivotally mounted to the body 11 intermediate the hooks 12 for rotational movement about an axis 17. When the hooks 12 are in the engaged position shown in FIG. 1, one arm of the lever 16 is arranged to contact a removable ground safety pin 18, and the other arm of the lever 16 is contacted by a piston assembly 19. A square slot 40 is provided centrally of the lever 16 for a purpose to be hereinafter described.

An over-centre spring mechanism 20 is connected between the body 11 and the hook connecting linkage and is arranged so as to urge the hooks 12 into both their engaged and retracted positions.

A breech assembly 21 is provided with two apertures 21a and 21b which, during operation, house electrically operated explosive cartridges, and electrical connections to the unit are made through an electrical socket 22. Passages (not shown) in the body 11 connect the breech assembly 21 to the piston 19, and passages 23 connect the breech assembly 21 to ejector rams (not shown) located one at each end of the unit 10 outboard of each hook 12.

The embodiment shown in FIGS. 1 to 3 is intended to carry a store 14 provided with saddle lugs 24 attached by recessed retaining screws 25 screwed into the store 14. The saddle lug 24 is provided with two laterally spaced-apart recesses 26 (only one being shown), and the hook 12 is a double-pronged hook for mating engagement in the recesses 26 when in its engaged position.

The ejector release unit 10 incorporates a crutchless sway-bracing system as hereinbefore defined, and a spigot 27 is screwed into the body 11 and protrudes from a lower surface thereof for location in the recess in the retaining screw 25.

An axially slidable, headed plunger 28 extends through the spigot 27 to protrude from upper and lower surfaces thereof, and is retained by an annular boss 29 pinned to an upper end. A compression spring 39 is located on the plunger 28 between the bottom of a recess in the spigot 27 and a shoulder provided by the headed portion to urge the lower headed end of the plunger 28 downwardly out of the spigot 27 to the limit defined by the boss 29.

A bell crank lever 30 (FIGS. 1 and 2) is mounted on a pin 31 supported in flanges on the body 11 for pivotal movement about an axis 32 that is parallel to the pivot axis 13 of the adjacent hook 12. The lever 30 is laterally aligned with the plunger 28 and the hook 12, and a spring 33 urges a first arm 30a of the lever 30 towards the hook 12. The first arm 30a is dimensioned so that, when a store 14 is fitted as illustrated in FIG. 1, the arm 30a overlaps a laterally aligned lug 34 protruding from an adjacent surface of the hook 12. A second arm 30b of the lever 30 is operatively associated with an upper end of the plunger 28 for a purpose to be hereinafter described.

FIG. 3 illustrates the position of the components when the store 14 has been released. Thus it will be seen that the hook 12 has pivoted about the axis 13 to its retracted position, and the plunger 28 has been moved downwardly under the influence of the spring 39 to the limit of its travel. The bell crank lever 30 has pivoted about the axis 32 to a position in which an end surface of the arm 30a is located against a protruding surface of the lug 34 formed on the hook 12.

Referring now to FIG. 4, a further embodiment of the invention is illustrated in which the store 14 is supported by a bale lug 35 for engagement by a single-pronged hook 12 in a manner well known in the art. In such an arrangement sway-bracing is normally provided by a crutched system as hereinbefore defined and, in the embodiment illustrated this is facilitated by a crutch arm adaptor 36 attached to the body 11 in place of the spigot 27 of the embodiment of FIGS. 1 to 3, so as to provide a convertible facility as disclosed in our said co-pending patent application. In other respects the embodiment of FIG. 4 corresponds with that illustrated in FIGS. 1 to 3.

For the purposes of the present invention, the crutch arm adaptor 36 is attached by a threaded retainer 37 housing an axially slidable plunger 28 operatively associated with a bell crank lever 30 in a manner similar to that illustrated in FIGS. 1 to 3. The retainer 37 is provided with a blind hexagonal slot 38 to facilitate assembly.

In operation of the embodiment of the invention illustrated in FIGS. 1 to 3 inclusive, electrical actuation of explosive cartridges in the breech assembly 21 causes pressurized gas to actuate the piston 19, thereby pivoting the lever 16 about the axis 17 to move the hooks 12 from the engaged position (FIG. 1) to the retracted position (FIG. 3), thereby releasing the store 14. Pressurized gas is simultaneously ducted through the passages 23 to the ejector rams (not shown) to positively force the store away from the aircraft.

As the hook 12 moves away from its engaged position, the plunger 28 is moved downwardly under the influence of the spring 39, thus allowing the bell crank lever 30 to pivot about the axis 32 under the influence of the spring 33 to move the arm 30a towards the hook 12. When the hook 12 reaches its fully retracted position (FIG. 3), the end of the arm 30a is driven into engagement with the surface of the lug 34, thereby capturing the hook 12 in its retracted position and positively preventing any tendency of the hook 12 to rebound to an intermediate position.

When a new store 14 is lifted into position, the protruding lower end of the plunger 28 is contacted by a surface of the recess in the saddle lug retaining screw 25 to lift the plunger 28 so that the upper end contacts the arm 30b of the bell crank lever 30, thereby moving the arm 30a out of engagement with the lug 34 on the hook 12. The hook 12 is then moved to the engaged position to support the store 14 by insertion of a special tool in the square slot 40 in the lever 16 to rotate the lever 16 about the axis 17 against the force of the over-centre spring mechanism 20. As the mechanism 20 moves over centre, the hooks 12 are urged into their engaged position, and the ejector release unit is ready for operation.

Operation of the embodiment of the invention illustrated in FIG. 4 is similar to that of FIGS. 1 to 3 except that, in this case, the lower end of the plunger 28 is engaged by an upper surface of the bale lug 35 as the store 14 is lifted into position.

It will be noted that in the embodiment of FIG. 4, the plunger 28 is not provided with a return spring, such as the spring 39 in the embodiment of FIGS. 1 to 3. This is because the small mass of the plunger 28, in comparison with that of the embodiment of FIGS. 1 to 3, that enables the plunger 28 to be urged downwardly by the spring 33 on the bell crank lever 30 as the store 14 is released. Clearly, however, an individual return spring can readily be incorporated if it is considered desirable.

In other embodiments of the invention, the spring mechanism 20 does not have an over-centre characteristic, and is arranged so as to permanently urge the hooks 12 into their engaged position. During operation to release a store, the spring force is overcome by the force exerted by the pressurized gas, the hooks 12 thereafter being retained in the fully retracted position by the arm 30a of the bell crank lever 30 engaging the lug 34 on the hook 12 in a manner similar to that previously described. However, in such embodiments, as a store 14 is lifted into position and the hook 12 is freed by the resulting pivotal movement of the bell crank lever 30, the hook 12 is automatically moved into its engaged position under the influence of the spring mechanism 20, thereby providing automatic latching that dispenses with the manual actuation of the hooks 12 as described in relation to the illustrated embodiments.

Although several embodiments have been described and illustrated it will be understood that many modifications can be made without departing from the scope of the invention as defined in the appended claims. For example, the shape and mounting of the lever 30 may be varied to suit other forms of hook arrangement in an ERU. The plunger 28 may be located in any suitable position so as to be operatively associated with the lever 30, and other types of automatically operable means may be used in place of the plunger 28.

I claim as my invention:

1. An ejector release unit having a pair of longitudinally spaced-apart hooks pivotally mounted for movement between a retracted position to permit loading and release of a store and an engaged position in which the hooks are arranged to engage supporting lugs provided on the store, linkage interconnecting the hooks, a spring mechanism associated with the linkage to permanently urge the hooks into their engaged positions and operating means associated with the linkage to move the hooks between their engaged and retracted positions, a spring-loaded lever associated with at least one of the hooks and arranged so that an arm of the lever automatically engages a surface on the hook when the hook is in the retracted position thereof so as to retain the hook in that position, and an axially slidable plunger having one end protruding from the unit for engagement by a surface of the store when the store is lifted into position so as to move the arm out of engagement with the hook, thereby permitting movement of the hooks into engagement with the supporting lugs on the store.

2. An ejector release unit as claimed in claim 1, wherein said lever is a bell crank lever having a second arm operatively associated with an opposite end of said plunger.

3. An ejector release unit as claimed in claim 1, wherein said plunger is located in a retaining member attached to the unit.

4. An ejector release unit as claimed in claim 3, wherein said retaining member is a spigot arrangement for engagement, during operation, in a recess in a saddle lug attached to the store, the protruding end of the plunger being engaged by a bottom surface of the recess when the store is lifted into position.

5. An ejector release unit as claimed in claim 3, wherein said retaining member is a nut screwed into the unit, the protruding end of the plunger being engaged by an upper surface of a bale lug attached to the store when the store is lifted into position.

6. An ejector release unit as claimed in claim 5, wherein said nut serves to retain a crutch arm adaptor.

* * * * *